US00RE35266E

United States Patent [19]

Crafton et al.

[11] E Patent Number: Re. 35,266

[45] Reissued Date of Patent: Jun. 11, 1996

[54] FLEXIBLE CONVEYOR ASSEMBLY AND CONVEYING APPARATUS AND METHOD FOR LIFTING FLUID

[76] Inventors: James W. Crafton, P.O. Box 606, Evergreen (Jefferson), Colo. 80439; William W. Crafton, P.O. Box 134, Raymore (Cass), Mo. 64083

[21] Appl. No.: 123,493

[22] Filed: Sep. 17, 1993

Related U.S. Patent Documents

Reissue of:

[64] Patent No.: 5,048,670
Issued: Sep. 17, 1991
Appl. No.: 667,676
Filed: Mar. 11, 1991

[51] Int. Cl.[6] ..... B65G 15/00

[52] U.S. Cl. ..... 198/643

[58] Field of Search ..... 198/643, 833

[56] References Cited

U.S. PATENT DOCUMENTS

| | | | |
|---|---|---|---|
| 831,448 | 9/1906 | Leinweber | 198/643 X |
| 930,465 | 8/1909 | Fowler | 198/643 |
| 1,017,847 | 2/1912 | Carl | 198/643 |
| 1,703,963 | 3/1929 | Scruby | 198/643 |
| 1,740,821 | 12/1929 | Kneuper | 198/643 |
| 2,121,931 | 6/1938 | Sloan | 198/643 |
| 2,289,706 | 7/1942 | Hay | 198/643 |
| 2,329,913 | 9/1943 | Kizziar | 198/643 |
| 2,380,144 | 7/1945 | Bohannon | 198/643 |
| 2,704,981 | 3/1955 | Gustafson | 198/643 |
| 3,774,685 | 11/1973 | Rhodes | 198/643 |
| 4,146,477 | 3/1979 | Challenger | 210/924 |
| 4,652,372 | 3/1987 | Threadgill | 210/924 |
| 4,712,667 | 12/1987 | Jackson et al. | 198/643 |
| 4,832,182 | 5/1989 | Wallace, Jr. | 198/833 X |
| 4,962,847 | 10/1990 | Pisors et al. | 198/643 |

FOREIGN PATENT DOCUMENTS

| | | | |
|---|---|---|---|
| 2475155 | 8/1981 | France | 198/643 |
| 58-193806 | 11/1983 | Japan | 198/643 |
| 928067 | 5/1982 | U.S.S.R. | 198/643 |
| 953261 | 8/1982 | U.S.S.R. | 198/643 |
| 128719 | 6/1919 | United Kingdom . | |

*Primary Examiner*—D. Glenn Dayoan
*Attorney, Agent, or Firm*—Jefferson Perkins

[57] ABSTRACT

A conveying apparatus for lifting fluid includes a flexible conveyor assembly having a pair of flexible tubes forming respective tubular walls and an endless flexible rope conveyor extending through respective passages defined by the tubular walls. The rope conveyor has riser and return portions and upper and lower end portions. A pair of roller members and a motion-producing device are provided for mounting and moving the rope conveyor about an endless path with the riser and return portions of the conveyor moving in opposite directions relative to one another through the different passages. The riser portion of the rope conveyor and the one tubular wall of the flexible tube surrounding it form an annulus between them extending from a lower inlet end to an upper outlet end of the flexible tube. The radial dimension of the annulus and the velocity at which the rope conveyor is moved are preselected so that the riser portion in moving relative to the one tubular wall causes an annular-shaped turbulent stream of fluid to flow axially upwardly with the riser portion such that the annular-shaped stream is not substantially adhered to riser portion of the moving rope conveyor but instead is entrained by the moving riser portion and moved upwardly within an annular core flow region of the annulus to thereby lift fluid from the inlet end to the outlet end of the one flexible tube.

103 Claims, 3 Drawing Sheets

FLEXIBLE CONVEYOR ASSEMBLY AND CONVEYING APPARATUS AND METHOD FOR LIFTING FLUID

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to technologies for lifting fluid and, more particularly, is concerned with a flexible conveyor assembly and conveying apparatus and method for lifting fluid.

2. Description of the Prior Art

Up to the present time, the primary technology used to lift fluids from wells, such as water or oil wells, is a pump which employs pistons, cylinders, valves, seals and other mechanical devices. These mechanical devices are subject to wear, corrosion, leakage and other problems which give rise to inefficiency, high expense in installation and maintenance, and consumption of large amounts of power for operation. Also, the greater the distance the fluids need to be lifted, the greater these problems impact the use of such devices.

Various technologies providing alternatives to pumps have been considered in the past for lifting fluids from wells and other underground reservoir structures. One general type of alternative technology utilizes a flexible conveyor, such as a cable, rope or chain, entrained about upper and lower pulleys and moving along an endless path to raise and convey a fluid, such as crude oil, from an oil well. The fluid is lifted from the well primarily due to an adherence of the fluid to the flexible conveyor.

Prior art representative of this general type of alternative technology is found in U.S. pat. nos. to Fowler (930,465), Carl (1,017,847), Scruby (1,703,963), Kneuper (1,740,821), Sloan (2,121,931), Kizziar (2,329,913), Gustafson (2,704,981), Rhodes (3,774,685), and Jackson et al (4,712,667). As an example, in the Rhodes patent, a lift apparatus utilizes an endless conveyor in the form of a mop, entrained about a system of spaced idler sheaves and advanced through an outer casing. The endless conveyor is fabricated from fiber material secured to a wire rope which will absorb the fluid The portion of the conveyor that has absorbed fluid is pulled up to the surface through a tubular stringer At the surface, the fluid is recovered from the conveyor by passage through squeegee rolls of a wiper assembly. The outer casing provides an annular space for eccentrically mounting the tubular stringer which encloses the fluid ladened portion of the conveyor traveling upward to the surface The casing also provides space for the unladened return portion of the conveyor traveling back downward into the well, and as a guide and lateral support for a cartridge mounting a return idler None of these alternative technologies have proven useful for lifting fluids as evidenced by their lack of utilization for that purpose. They appear to have failed to recognize and utilize the necessary relationships that must be established between diameters, velocity and fluid properties. Instead, they have incorrectly viewed the lifting process as essentially one of adhering the fluid to the moving conveyor Consequently, these prior art implementations have not been successful and a need still remains for a viable alternative non-pumping technology to lift fluids.

SUMMARY OF THE INVENTION

The present invention provides a flexible conveyor assembly and conveying apparatus and method which satisfy the need for an alternative non-pumping technology for lifting fluid. Rather than being based on a pumping action for creating a pressure rise to cause fluid flow or relying on an adherence, such as by absorption, of the fluid to the conveyor, the novel alternative non-pumping technology of the present invention applies known Couette flow principles to successfully entrain an annular volume of fluid within an annulus by a riser portion of an endless flexible rope conveyor moving upwardly through a flexible tubular wall. Underlying the present invention is the discovery that the primary parameters of conveyor rope velocity and annulus radial dimension and their proper selection are primarily responsible for attainment of superior performance Accordingly, the present invention is directed to a flexible conveyor assembly for lifting fluid which comprises: (a) means for forming a flexible tubular wall defining an elongated passage and having opposite ends; and (b) an endless flexible rope conveyor having riser and return portions. The riser portion extends through the passage defined by the flexible tubular wall. The flexible rope conveyor has opposite end portions interconnecting the riser and return portions and extending from the opposite ends of the flexible tubular wall. The riser portion and the flexible tubular wall which surrounds the riser portion form an annulus therebetween extending between the opposite ends of the flexible tubular wall.

The flexible rope conveyor is engageable at its opposite end portions for causing and guiding movement of it about an endless path relative to the flexible tubular wall with the riser and return portions moving in opposite directions relative to one another. The radial dimension of the annulus and the velocity at which the flexible rope conveyor is moved relative to the flexible tubular wall is preselected so that the riser portion in moving relative to the flexible tubular wall can cause an annular-shaped turbulent stream of fluid to flow axially through the passage of the flexible tubular wall with the riser portion such that the annular-shaped stream is not substantially adhered to the riser portion of the flexible rope conveyor but instead is entrained by the moving riser position and moved within an annular core flow region of the annulus to thereby move fluid through the passage between the opposite ends of the flexible tubular wall Also, the present invention is directed to a conveying apparatus for lifting fluid which comprises (a) means for forming a flexible tubular wall defining an elongated passage and having a lower inlet end and an upper outlet end; (b) an endless flexible rope conveyor having riser and return portions, the riser portion extending through the passage defined by the flexible tubular wall, and opposite end portions interconnecting the riser and return portions and extending from the opposite ends of the flexible tubular wall; and (c) means for moving the flexible rope conveyor about an endless path with the riser and return portions of the conveyor moving in opposite directions relative to one another.

The riser portion and the flexible tubular wall which surrounds the riser portion form an annulus therebetween extending between the opposite inlet and outlet ends of the flexible tubular wall. The radial dimension of the annulus and the velocity at which the flexible rope conveyor is moved relative to the flexible tubular wall are preselected so that the riser portion in moving relative to the tubular wall causes an annular-shaped turbulent stream of fluid to flow axially upwardly with the riser portion such that the annular-shaped stream does not substantially adhere to the riser portion of the moving flexible rope conveyor but instead is entrained by the moving riser portion and moved upwardly within an annular core flow region of the annulus to thereby lift fluid from the inlet end to the outlet end of the flexible tubular wall.

Preferably, the riser and return portions of the flexible rope conveyor are disposed through the different flexible tubular walls. Thus, the riser and return portions move in opposite directions through passages defined by the flexible tubular walls relative to one another and relative to the tubular walls.

The moving means is an arrangement mounting the flexible rope conveyor and being operable for moving it. The mounting arrangement includes roller members mounting the opposite end portions of the flexible rope conveyor, and a motion-producing device for moving the flexible rope conveyor about the endless path with the riser and return portions of the rope conveyor moving in opposite directions relative to one another through the different passages.

Further, the present invention is directed to a conveying method for lifting fluid, which comprises the steps of: (a) providing a flexible tubular wall defining an elongated passage and having a lower inlet end and an upper outlet end; (b) disposing a riser portion of an endless flexible rope conveyor through the elongated passage of the tubular wall such that the riser portion and the flexible tubular wall form an annulus therebetween extending between the lower inlet end and upper outlet end of the tubular wall; (c) moving the flexible rope conveyor about an endless path with the riser portion of the rope conveyor moving upwardly through the passage; and (d) preselecting the radial dimension of the annulus and the velocity at which the flexible rope conveyor is moved relative to the flexible tubular wall so that the riser portion of the rope conveyor in moving relative to the tubular wall causes an annular-shaped turbulent stream to flow axially upwardly with the riser portion of the moving rope conveyor such that the annular-shaped stream is not substantially adhered to the riser portion of the moving rope conveyor but instead is entrained by the moving riser portion and moved upwardly within an annular core flow region of the annulus to thereby lift fluid from the inlet end to the outlet end of the flexible tubular wall. In one embodiment, the moving is accomplished by applying a circular drive traction to the flexible rope conveyor. In another embodiment, the moving is accomplished by applying a linear drive traction to the rope conveyor.

The flexibility of the tubular walls and rope conveyor of the conveyor assembly of the present invention permits the conveying apparatus to operate around corners and bends. Virtually no existing pumping technology is able to function reliably around bends. For example, a prior art sucker rod pump, such as used on a windmill, has to be employed in a hole that is reasonably straight. A centrifugal pump cannot pass around a corner so sharp that its shaft is bent, otherwise it fails mechanically. With respect to non-pumping technology, such as the prior art apparatus of the Rhodes patent, by employing a rigid tubular stringer to enclose and protect the fluid ladened portion of the mop conveyor the Rhodes apparatus cannot operate around a corner.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Conveying Apparatus For Lifting Fluid

Figure 1:
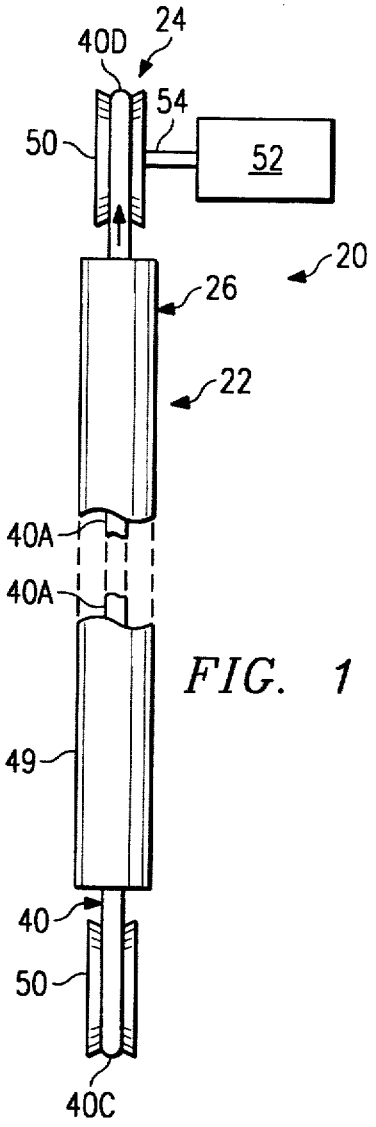
FIG. 1 is a side elevational view of a simplified embodiment of the conveying apparatus for lifting fluid in accordance with the principles of the present invention.

Referring to the drawings, and particularly to FIGS. 1–4, there is illustrated a simplified embodiment of a conveying apparatus, generally designated 20, for lifting fluid in accordance with the present invention. In its basic components, the conveying apparatus 20 includes a flexible conveyor assembly 22 and an arrangement 24 which mounts and operates the conveyor assembly 22 to lift fluids. The conveyor assembly 22 includes means 26, such as in the form of a pair of separate elongated flexible tubes 28, 30, for defining a pair of separate flexible tubular walls 32, 34 which, in turn, define respective separate elongated passages 36, 38, and an endless flexible rope conveyor 40 disposed through the tubes 28, 30. The arrangement 24 mounts the flexible rope conveyor 40 through the flexible tubes 28, 30 and is operable for moving it about an endless path through the passages 36, 38 of the tubes 28, 30.

The endless flexible rope conveyor 40 has riser and return portions 40A, 40B, which are disposed through the respective passages 36, 38 of the tubes 28, 30, and opposite lower and upper end portions 40C, 40D which interconnect the riser and return portions 40A, 40B and extend from the opposite ends of the tube passages 36, 38. The riser portion 40A of the flexible rope conveyor 40 and the one tubular wall 32 surrounding it form an annular gap or annulus 44 between them extending from a lower inlet end 46 to an upper outlet end 48 of the one tubular wall 32.

Although not so limited, as seen in FIGS. 1–4, the flexible rope conveyor 40 preferably has a substantially circular cross-section and can be composed of any suitable flexible material, for example, plastic or hemp. The material composing the rope conveyor is sufficiently flexible so as to permit bending of the conveyor assembly 22; however, the material is substantially inelastic so as to avoid stretching of the rope conveyor 40. Also, it should be understood that the term "rope" is used herein for the purpose of brevity in describing or characterizing the nature of the conveyor 40 and not for purposes of limitation. Other terms such as "string", "band", "strand" can be considered interchangeable with "rope" and could have been used in its place to describe the type of conveyor 40 employed by the conveyor assembly 22.

The flexible tubular walls 32, 34 defined by the flexible tubes 28, 30 surrounding the riser and return portions 40A, 40B of the rope conveyor 40 preferably have a cross-sectional geometry similar to the rope conveyor 40. The tubes 28, 30 can be composed of any suitable flexible material, for example, plastic. The material composing the tubes 28, 30 is sufficiently flexible so as to permit bending of the conveyor assembly 22; however, the material is substantially inelastic so as to avoid stretching of the tubes. An outer flexible sheath 49 surrounds and supports the flexible tubes 28, 20 of the conveyor assembly 22.

Figure 2:
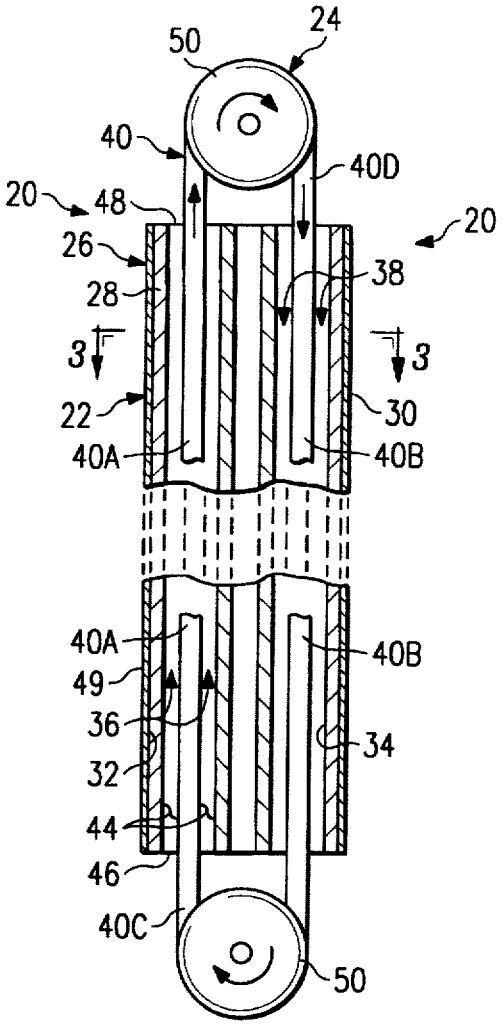
FIG. 2 is a longitudinal sectional view of the apparatus of the present invention.
Figure 3:
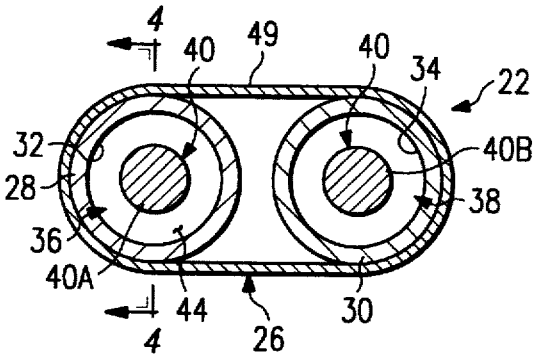
FIG. 3 is an enlarged fragmentary cross-sectional view of a flexible conveyor assembly of the conveying apparatus taken along line 3—3 of FIG. 2.
Figure 4:
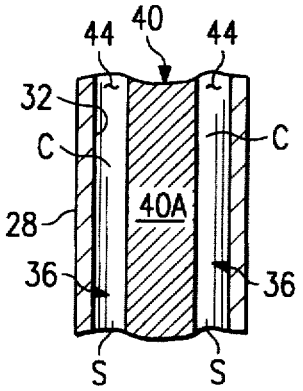
FIG. 4 is an enlarged fragmentary longitudinal sectional view taken along line 4—4 of FIG. 3.

The arrangement 24 in the conveying apparatus 20 includes rotatable roller members 50, such as in the form of pulleys or sheaves, respectively located adjacent to and mounting the lower end portion 40C and upper end portion 40D of the endless rope conveyor 40 for movement along the endless path. The arrangement 24 also includes a motion-producing device 52 having an output drive shaft 54 connected to the upper one of the roller members 50. Operation of the device 52 rotates its output drive shaft 54, transmitting rotary motion to the upper roller member 50 and thereby applying a circular drive traction to the rope conveyor 40 to move it about the endless path with its riser and return portions 40A, 40B moving in opposite directions relative to one another through the different passages 36, 38. Referring to FIGS. 1 and 2, as an example, the motion-producing device 52 is an electric motor. Alternatively, the device 52 can be an engine, hand crank, windmill, solar powered motor, etc.

The radial dimension of the annulus 44 (being the difference between the diameters of the tubular wall 32 and the rope conveyor 40) and the velocity at which the rope conveyor 40 is moved relative to the one tubular wall 32 are preselected so that the riser portion 40A of the flexible rope conveyor 40 in moving relative to the one tubular wall 32 causes an annular-shaped turbulent stream S of fluid to flow axially upwardly with the riser portion 40A such that the annular-shaped turbulent stream S is not substantially adhered to the riser portion 40A. Instead, the annular-shaped stream S is entrained by the moving riser portion 40A and moved upwardly within an annular core flow region C of the annulus 44 to thereby lift fluid from the lower inlet end 46 to the upper outlet end 48 of the one tubular wall 32.

Underlying the present invention is the discovery that the primary parameters of conveyor rope velocity and annulus radial dimension and their proper selection are primarily responsible for attainment of superior performance. The conveyor velocity and annulus radial dimension are preselected so as to ensure that the annulus 44 properly forms the annular core flow region C in the conveying apparatus 20 around the upwardly moving rope conveyor riser portion 40A. The formation of the annular core flow region C serves to enhance the fluid lifting rate. When such core flow region C is properly formed, the annular-shaped stream S which occupies the region C will exhibit the characteristics of turbulent flow.

To reiterate, the annular-shaped turbulent stream S does not substantially depend on adherence to the riser portion 40A of the rope conveyor 40 for its movement. Instead, the proper selection of conveyor velocity and annulus radial dimension in combination with the creation of stresses within the fluid in accordance with known Couette flow principles, by movement of the rope conveyor riser portion 40A relative to the one tubular wall 32, produces the desired movement of the annular-shaped turbulent stream S within the annular core flow region C of the annulus 44 concurrently with the moving riser portion 40A of the rope conveyor 40.

Figure 5:
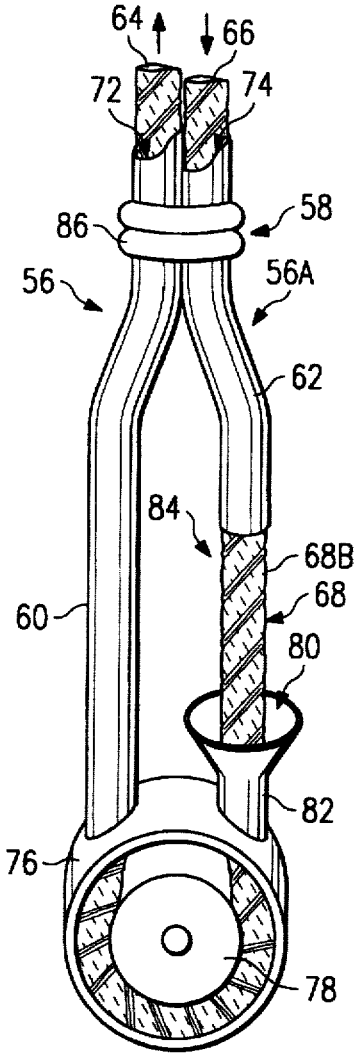
FIG. 5 is an enlarged fragmentary perspective view of a lower portion of another embodiment of the conveying apparatus for lifting fluid in accordance with the principles of the present invention.
Figure 6:
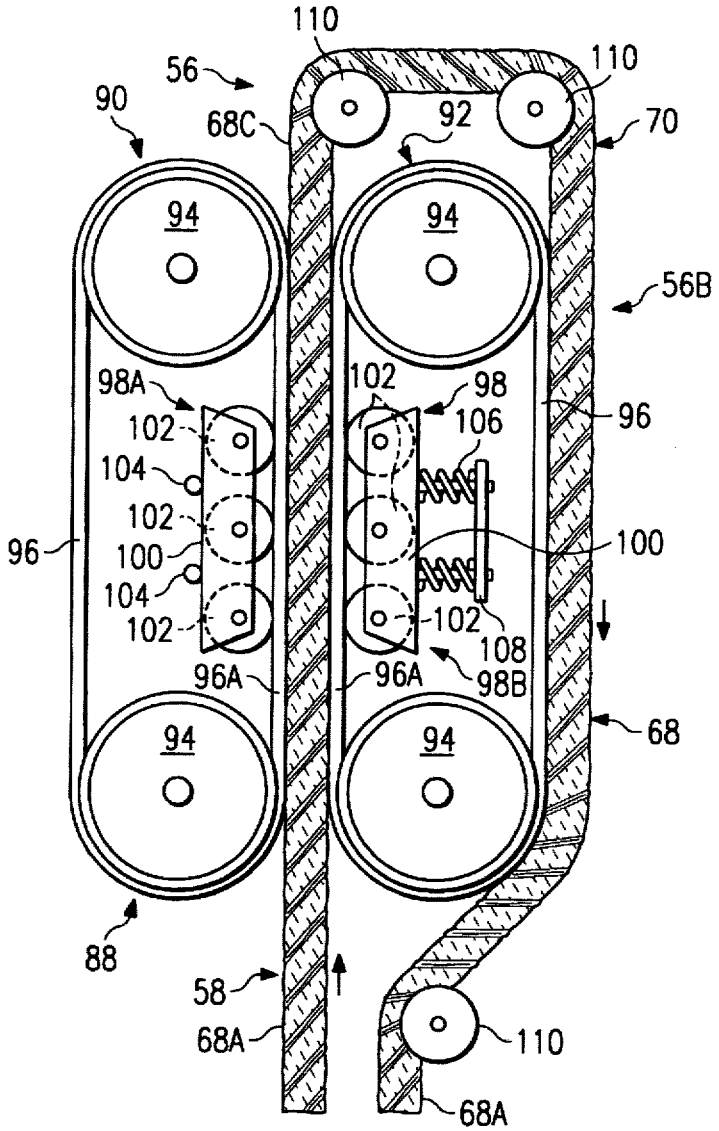
FIG. 6 is an enlarged fragmentary side elevational view of an upper portion of the embodiment of the conveying apparatus of FIG. 5.

Referring now to FIGS. 5 and 6, there is illustrated lower and upper portions 56A, 56B of another embodiment of the conveying apparatus of the present invention, generally designated 56. In its basic components, the conveying apparatus 56 is substantially the same as the earlier conveying apparatus 20. Thus, the conveying apparatus 56 includes a flexible conveyor assembly 58 composed by a pair of flexible tubes 60, 62 defining a pair of separate tubular walls 64, 66 and an endless flexible rope conveyor 68, and an arrangement 70 mounting the rope conveyor 68 through the tubes 60, 62 and being operable for moving it about an endless path through separate elongated passages 72, 74 defined by he tubular walls 64, 66 of the flexible tubes 60, 62.

However, at the lower portion 56A of the conveying apparatus 56, the flexible tubes 60, 62 at their lower ends merge into a lower annular housing 76 surrounding a lower roller member 78. Also, a lower inlet end 80 is defined by a flared section 82 at an interruption 84 in the tube 62. The flexible tubes 60, 62 are held together by means such as a strip of tape 86 wound about the tubes 60, 62 a short distance above the lower roller member 78.

The upper portion 56B of the conveying apparatus 56 employs a different motion-producing device 88 for moving the rope conveyor 68 about the endless path with the riser and return portions 68A, 68B of the rope conveyor 68 moving in opposite directions relative to one another through the different elongated passages 72, 74. Compared to the motion-producing device 52 which through the drive shaft 54 and upper one of the roller members 50 applies a circular drive traction, the motion-producing device 88 of FIG. 6 applies a linear drive traction to the rope conveyor 68 via a pair of linear drives 90, 92. The motion-producing device 88 includes the pair of linear drives 90, 92 disposed on opposite sides of an upper end portion 68C of the rope conveyor 68. Each drive 90, 92 is composed of a pair of spaced pulleys 94 and a drive belt 96 entrained about and extending between the pulleys 94.

The device 88 also includes a multi-roller mechanism 98 which clamps the adjacent runs 96A of the drive belts 96 against opposite sides of the rope conveyor 68. The adjacent runs 96A of the drive belts 96 move along straight paths and press from opposite sides against the rope conveyor 68 so as to apply a linear drive traction to the rope conveyor 68 The linear, parallel motion of the belt runs 96A pulls the rope conveyor 68 between them.

More particularly, the multi-roller mechanism 98 includes a pair of clamp parts 98A, 98B, each having a holder 100 and a plurality of rollers 102. The one clamp part 98A is stationarily mounted by brackets 104. The other clamp part 98B is mounted by springs 106 and brackets 108 for reciprocal movement toward and away from the rope conveyor 68 and the opposite clamp part 98A. Also, a plurality of idlers 110 are stationarily mounted adjacent the one linear drive 92 for routing the rope conveyor 68 about it. One of the pulleys 94 of each of the linear drives 90, 92 can be coupled to and driven by any suitable source, such as a motor and gear box.

Figure 7:
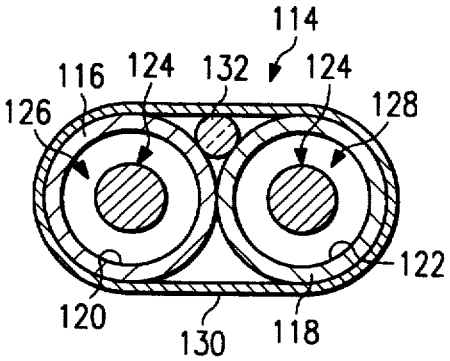
FIG. 7 is a cross-sectional view similar to FIG. 3, but illustrating another embodiment of the flexible conveyor assembly of the conveying apparatus.

Referring to FIG. 7, there is illustrated a cross-section of a modified flexible conveyor assembly 114 which can be employed by the conveying apparatus of the present invention. Similar to the flexible conveyor assembly 22 of FIGS. 1–4, the flexible conveyor assembly 114 includes a pair of flexible tubes 116, 118 defining a pair of separate tubular walls 120, 122, and an endless flexible rope conveyor 124 disposed through elongated passages 126, 128 defined by the flexible tubes 116, 118. The same mounting and operating arrangements (not shown) as employed in either one of the conveying apparatuses 20, 56 can be used for mounting the rope conveyor 124 and operating it to move it about an endless path through the separate passages 126, 128 of the tubes 116, 118.

In addition, the flexible conveyor assembly 114 includes an outer sheath 130 such as formed by a tape of glass or epoxy fiber material spirally wound and wrapped about the flexible tubes 116, 118. Also, an elongated flexible tension member 132 is provided, extending alongside the tubes 116, 118. The sheath 130 of wrapped tape encircles the tension member 132 as well as the tubes 116, 118. The tension member 132 supports the weight of the tubes 116, 118, rope conveyor 124, fluid in the tube 116, and a lower idler roller (not shown) when the flexible conveyor assembly 114 is suspended into a well.

Figure 8:
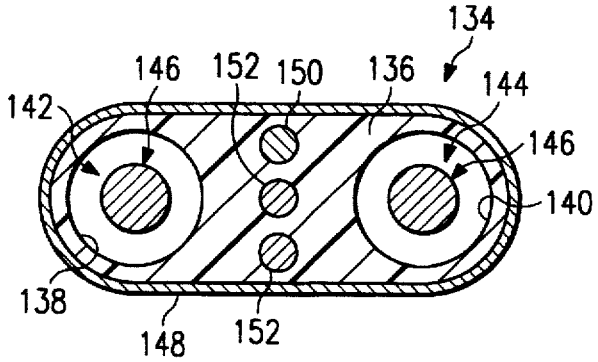
FIG. 8 is a cross-sectional view similar to FIG. 7, but illustrating still another embodiment of the flexible conveyor assembly of the conveying apparatus.

Referring to FIG. 8, there is illustrated a cross-section of another modified flexible conveyor assembly 134 which can be employed by the conveying apparatus of the present invention. Instead of employing a pair of flexible tubes as in the case of the earlier flexible conveyor assemblies 22, 58, 114, the flexible conveyor assembly 134 of FIG. 8 is composed by a flexible solid core 136 of foam plastic material, such as a single extrusion of PVC, having a pair of separate spaced tubular walls 138, 140 formed axially through the interior of the flexible core 136. The tubular walls 138, 140 define respective separate elongated passages 142, 144. An endless flexible rope conveyor 146, the same as those previously described, is disposed through the passages 142, 144 of the flexible core 136. The same mounting and operating arrangement (not shown) is used for mounting the conveyor 146 and for moving it about an endless path through the passages 142, 144 defined by the interior tubular walls 138, 140 of the flexible core 136.

The flexible conveyor assembly 134 also includes an outer sheath 148 composed of glass or epoxy fiber tape spirally wound and wrapped about the foam core 136. Also, in addition to the interior tubular walls 138, 140, the flexible core 136 includes an elongated flexible tension member 150 and signal conductor cables 152 extending through the foam core 136 alongside and spaced between the tubular walls 138, 140. The tension member 150 supports the weight of the flexible core 136, fluid in the core 136, and a lower idler roller (not shown) when they are suspended into a well, while the conductor cables 152 can be used to transmit signals to and from downhole instrumentation.

Figure 11:
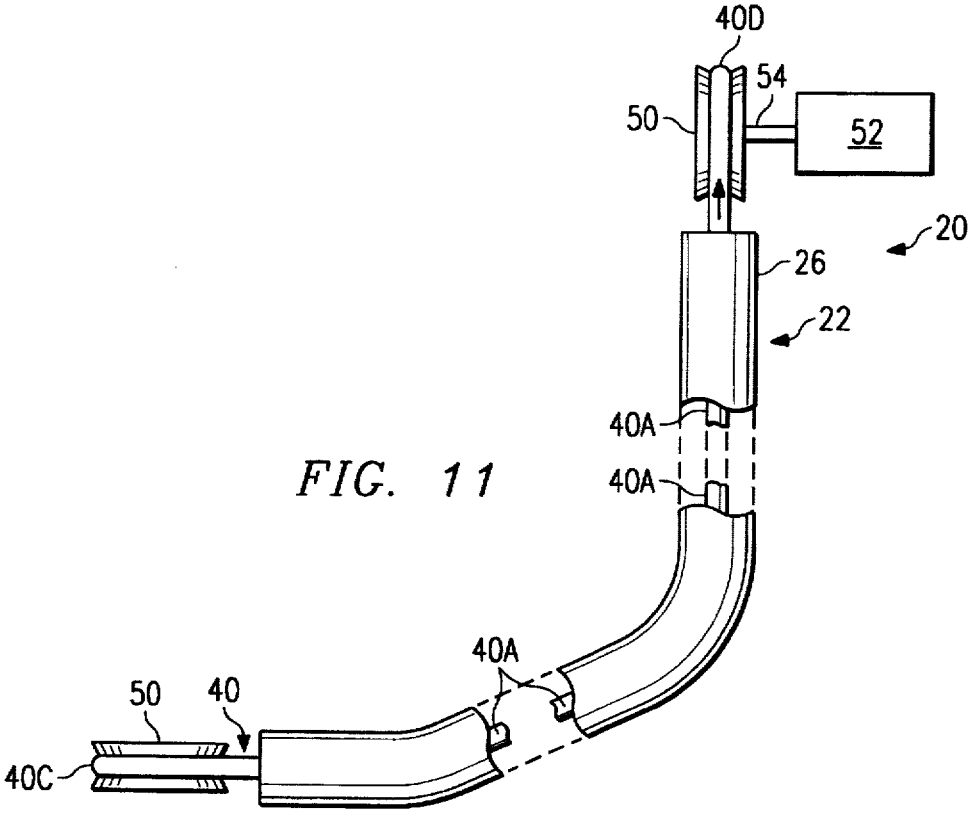
*FIG. 11 is a side elevational view of the apparatus shown in FIG. 1, shown disposed around a corner or bend.*

The different embodiments having the constructions described above provide a conveying apparatus with a flexible conveyor assembly capable of operating while extending around corners and bends. *For example, FIG. 11 illustrates the apparatus of FIG. 1 as extending around a corner or bend.* Virtually no existing pumping nor non-pumping technology is capable of operating in this manner. At the extreme, the conveying apparatus of the present invention will even operate when deployed in a circular configuration.

Figure 9:
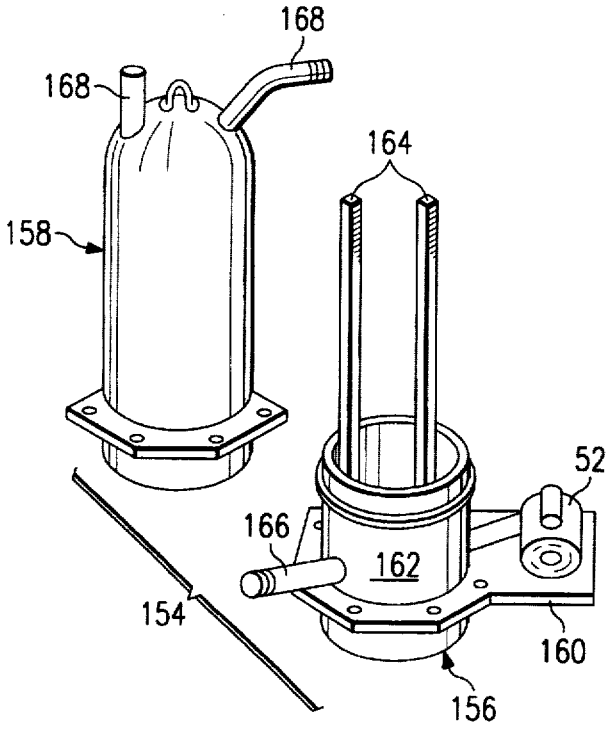
FIG. 9 is a perspective view of an air-tight container for supporting the conveying apparatus at a wellsite, the container being illustrated in disassembled condition.
Figure 10:
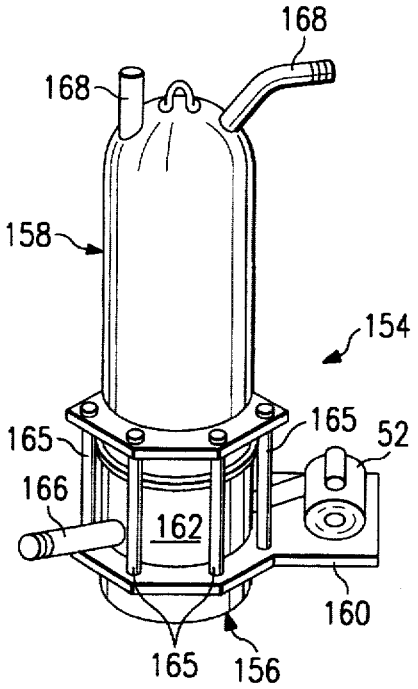
FIG. 10 is a perspective view of the air-tight container in assembled condition.

Referring to FIGS. 9 and 10, there is illustrated an air-tight container 154 composed of a base 156 and a top closure 158 for supporting the conveying apparatus 20, 56 at a wellsite. The base 156 rests on the ground surface, wellhead, stand or casing at a wellsite. The base 156 has a peripheral flange 160 which supports the motion-producing device 52 and a support head 162 which supports the upper portion of the flexible conveyor assembly 22, 58 of the conveying apparatus 20, 56. The base 156 also mounts a support frame 164 which supports the drive roller members 50 of the mounting arrangement 24 (FIGS. 1 and 2) or the linear drives 90, 92 (FIG. 6) about which pass respectively the rope conveyors 40, 68. The driveline from the motion-producing device 52 passes through the side of the support head 162 and has one or more pressure seal bearings (not shown) to provide pressure isolation of the fluids and gases within the container 154.

When the top closure 158 is applied to the base 156, as shown in FIG. 10, it is retained thereon by a plurality of elongated bolts 165 interconnecting the top closure 158 with the base 156 to form an air-tight pressure seal with the base 156. The air-tight sealed container 154 thus encloses the upper portion of the respective apparatus 20, 56, except for the motion-producing device 52. Extending from the side of the container 154 is a pipe 166 through which the lifted fluids flow out to a storage location. Other pipes 168 lead from the top of the top closure 158 for use to transport natural gas away from an oil well. The upper portion of the conveying apparatus 20, 56 serves as a gas/liquid separator for the wellsite. The container 154 is air-tight to meet environmental air pollution requirements.

One of the major factors in minimizing the power consumption of the conveying apparatus is the balanced nature of the apparatus. When starting up, there will be no fluid in the apparatus, therefore the power supplied is only overcoming the friction and inertia of the rope conveyor, which weighs approximately the same amount on the riser and return sides of the apparatus. The load increases approximately linearly as the fluid is lifted up the riser side, so for very efficient start-up the apparatus could also linearly accelerate. When running, there is no reciprocating motion to cause increased power consumption by reversing direction (inertia) of sucker rods, for example. The power source is only lifting the fluid and overcoming friction. Upon shutdown, the fluid drains out of the riser side. If that were to occur too quickly, it could impose excessive stress on the riser side, so shut-down could also be performed gradually by linearly decelerating the rope conveyor, so that the fluid gradually falls back.

Because the tube on the return side of the apparatus is used to guide the rope conveyor back down the well, it can also serve at least one other function. If it is necessary to pump treating fluids, such as acid or surfactants, downhole, those fluids can be conveyed to the sandface via the return side of the apparatus at considerable pressure increase. Simultaneously, the spent fluids can be removed via the riser side of the apparatus, if desired. Also, upon the event of failure of the tube on the riser side of the apparatus due to wear, the direction of motion of the rope conveyor can be reversed making the tube on the return side the riser and vice versa. That will provide additional longevity prior to the need for replacement of the conveyor assembly.

Experimentation And Observations Regarding the Effect of Annulus Radial Dimension And Rope Speed on Lifting Rate As mentioned earlier, underlying the present invention is the discovery that the primary parameters of conveyor velocity and annulus radial dimension and their proper selection are primarily responsible for attainment of superior performance. When these parameters are carefully selected, experiments have shown that the volume of fluid moved by the conveying apparatus and method of the present invention far exceeds that predicted by known Couette-Poiseuille flow principles. A detailed explanation of these known principles can be obtained by reference to the book: Churchill, S. W., Viscous Flows, The Practical Use of Theory. (1988), pgs. 107–130, Butterworths, Boston, Mass.

For achieving a particular fluid lifting rate, an optimum set of parameters regarding conveyor velocity and annulus radial dimension can be preselected through trial and error experimentation to ensure that the annular core flow region, which accounts for the enhanced performance of the conveying apparatus, is properly formed around the riser portion of the conveyor. The formation of the annular core flow region serves to enhance the fluid lifting rate. When such core flow region is properly formed, the annular-shaped stream which occupies the region will exhibit the characteristics of turbulent flow.

Numerous experiments were conducted by the inventor to verify performance of the conveying apparatus using two sets of tubing and rope sizes, and several different rope speeds and configurations. These experimental data are shown in TABLE I below.

The series of experiments with prototype conveying apparatus producing the data of TABLE I were conducted with different lift distances, three types of tubing and several types of rope. TABLE I does not distinguish between the particular type of tubing or rope, although the columns do pertain to each experimental set. The primary purpose of TABLE I is to demonstrate the breadth of experiments performed and to support the assertion that the physical behavior of the conveying apparatus is dependent on the hydraulic diameter (radial dimension of the annulus) and rope velocity or speed. It is apparent from TABLE I that increased rope speed increases throughput. It also seems to show higher flow rates (e.g. *46* BWPD vs. 9 BWPD at 180 fpm) with the smaller tubing size at lower rope speeds, which would not be logical, if the classical Couette theory described the whole process.

TABLE I

| Rope | Volume Lifted vs. Rope Speed and Tubing/Rope Size Water Rate Lifted (BWPD) Lift Height(ft) | | | | | | | | | |
|---|---|---|---|---|---|---|---|---|---|---|
| Speed (ft/ | 7 | 7 | 7 | 7 | 4 | 48 | 6 | 48 | 48 | 82 |
| | Tbg/Rope Dia. (in) | | | | | | | | | |
| min) | 3/4 × 3/8 | | | | | | 5/8 × 1/4 | | | |
| 980 | | | | | | | | | | 175 |
| 690 | | | | | | | | 147 | | |

TABLE I-continued

| Rope | Volume Lifted vs. Rope Speed and Tubing/Rope Size Water Rate Lifted (BWPD) Lift Height(ft) | | | | | | | | | |
|---|---|---|---|---|---|---|---|---|---|---|
| Speed (ft/ | 7 | 7 | 7 | 7 | 4 | 48 | 6 | 48 | 48 | 82 |
| | Tbg/Rope Dia. (in) | | | | | | | | | |
| min) | 3/4 × 3/8 | | | | | | 5/8 × 1/4 | | | |
| 560 | | | | | 82 | 131 | | 74 | 62 | |
| 419 | | | | | | | | | | 40 |
| 350 | | | | | | | 36 | | | |
| 280 | | | | | | | 27 | | | |
| 265 | | | | | | | 24 | | | |
| 232 | | | 10 | | | | | | | 73 |
| 210 | 10 | 10 | | | | | | | | |
| 195 | 8 | 10 | 7 | 6 | | | | | | 25 |
| 180 | 8 | 9 | | | | | | | | 46 |
| 165 | 7 | 8 | 5 | 4 | 6 | | | | | |
| 150 | 4 | 7 | | | 6 | | | | | |
| 135 | | 4 | | 2 | | | | | | |
| 80 | 3 | 1 | | | 0 | | | | | |

To obtain the data in TABLE I, the prototype was assembled and operated in a stabilized condition, i.e. until the rope speed and flowrate were constant. Then, from the known length of the rope and lift height, timing the rope s travel time provided the rope speed. The fluid flowrate was measured by recording the time to fill a container of known volume, usually a one quart container. The table only shows a small portion of the data, since many of the data points represent averages of many observations.

Also, the inventor has performed a comparison between the actual performance and the theoretically predicted performance, according to the principles of Couette-Poiseuille flow. From the data of TABLE I and graphs of this comparison, it has been concluded that there clearly exists an optimum tubing and rope diameter (and thus annulus radial dimension) and rope speed to meet the design objectives of a particular fluid lifting rate. Also, it has been concluded that there exists a "core flow region" around the rope which significantly enhances the lifting rate. A "core flow region", which exhibits the characteristics of turbulent flow, is required to match observed performance to theory. Finally, it has been concluded that the behavior of the lifting process of the apparatus is predictable, using a modified Couette flow theory, which considers the radial annulus, the core flow region and the fluid density.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A flexible conveyor assembly for use in a conveying apparatus for lifting fluid, said assembly comprising:

(a) means for forming a flexible tubular wall defining an elongated passage and having respective opposite ends; and (b) an endless flexible rope conveyor having riser and return portions, said riser portion extending through said passage defined by said flexible tubular wall, said flexible rope conveyor also having opposite end portions interconnecting said riser and return portions and extending from said opposite ends of said flexible tubular wall, said riser portion and said flexible tubular wall which surrounds said riser portion forming an annulus therebetween extending between said opposite ends of said flexible tubular wall;

(c) said flexible rope conveyor being engageable at said opposite end portions for causing and guiding movement of said flexible rope conveyor about an endless path relative to said flexible tubular wall with said riser and return portions moving in opposite directions relative to one another, the radial dimension of said annulus and the velocity at which said flexible rope conveyor is moved relative to said flexible tubular wall being preselected so that said riser portion in moving relative to said flexible tubular wall can cause an annular-shaped turbulent stream of fluid to flow axially through said passage of said flexible tubular wall with said riser portion such that said annular-shaped stream is not substantially adhered to said riser portion of said flexible rope conveyor but instead is entrained by said moving riser portion and moved within an annular core flow region of said annulus to thereby move fluid through said passage between said opposite ends of said flexible tubular wall.

2. The assembly of claim 1 wherein said means for forming said flexible tubular wall is an elongated hollow flexible tube.

3. The assembly of claim 1 further comprising:

an elongated tension member extending alongside said flexible tube and being attached thereto for supporting the weight of said flexible tube and said rope conveyor.

4. The assembly of claim 1 wherein said means for forming said flexible tubular wall is an elongated solid core of plastic material having said tubular wall defined through the interior of said core.

5. The assembly of claim 4 further comprising:

an elongated tension member extending through the interior of said core alongside and spaced from said tubular wall for supporting the weight of said core and said rope conveyor.

6. A flexible conveyor assembly for use in a conveying apparatus for lifting fluid, said assembly comprising:

(a) means for forming a pair of flexible tubular walls defining separate elongated passages and having respective opposite ends; and (b) an endless flexible rope conveyor composed of a pair of riser and return portions extending through different ones of said respective passages defined by said flexible tubular walls, and a pair of opposite end portions interconnecting said riser and return portions and extending from said respective opposite ends of said flexible tubular walls, said riser portion of said flexible rope conveyor and the one of said flexible tubular walls surrounding said riser portion forming an annulus therebetween extending between said opposite ends of said one flexible tubular wall;

(c) said flexible rope conveyor being engageable at its opposite end portions for causing and guiding movement of said flexible rope conveyor about an endless path relative to said flexible tubular walls with said riser and return portions of said flexible rope conveyor moving in opposite directions relative to one another through said respective passages, the radial dimension of said annulus and the velocity at which said flexible rope conveyor is moved relative to said one flexible tubular wall being preselected so that said riser portion in moving relative to said one flexible tubular wall can cause an annular-shaped turbulent stream of fluid to flow axially through said passage of said one flexible tubular wall with said riser portion such that said annular-shaped stream is not substantially adhered to said riser portion of said flexible rope conveyor but instead is entrained by said moving riser portion and moved within an annular core flow region of said annulus to thereby move fluid between said opposite ends of said passage through said one flexible tubular wall.

7. The assembly of claim 6 wherein said means for forming said flexible tubular walls is a pair of elongated hollow flexible tubes.

8. The assembly of claim 7 further comprising:

an elongated tension member extending alongside said flexible tubes and being attached thereto for supporting the weight of said flexible tubes and said rope conveyor.

9. The assembly of claim 6 wherein said means for forming said flexible tubular walls is an elongated solid core of plastic material having said tubular walls defined through the interior of said core.

10. The assembly of claim 9 further comprising:

an elongated tension member extending through the interior of said core alongside and spaced from said tubular walls for supporting the weight of said core and said rope conveyor.

11. A conveying apparatus for lifting fluid, comprising:

(a) means for forming a flexible tubular wall defining an elongated passage and having opposite ends;

(b) an endless flexible rope conveyor having riser and return portions, said riser portion being surrounded by said tubular wall and disposed through said passage defined by said tubular wall, said flexible rope conveyor also having opposite end portions interconnecting said riser and return portions and extending from said opposite ends of said flexible tubular wall, said riser portion and said flexible tubular wall forming an annulus therebetween extending between said opposite ends of said tubular wall; and (c) means for engaging said opposite end portions of said flexible rope conveyor and being operable for moving said rope conveyor about an endless path with said riser and return portions of said rope conveyor moving in opposite directions relative to one another, the radial dimension of said annulus and the velocity at which said rope conveyor is moved relative to said tubular wall being preselected so that said riser portion in moving relative to said tubular wall causes an annular-shaped turbulent stream of fluid to flow axially upwardly with said riser portion such that said annular shaped stream is not substantially adhered to said riser portion of said rope conveyor but instead is entrained by said moving riser portion and moved upwardly within an annular core flow region of said annulus to thereby lift fluid through said passage of said tubular wall.

12. The conveying apparatus as recited in claim 11, [said moving means] *wherein said means for engaging* includes:

an arrangement movably supporting said opposite end portions of said rope conveyor; and a drive mechanism coupled with said arrangement and being operable for moving said rope conveyor about said endless path.

13. The conveying apparatus as recited in claim 12, wherein said arrangement includes a pair of rotatable roller members entraining said opposite end portions of said rope conveyor adjacent to said opposite ends of said tubular wall.

14. The conveying apparatus as recited in claim 13, wherein said drive mechanism is a motion-producing device connected to one of said roller member and being operable for rotating said roller member and thereby moving said rope conveyor about said endless path with said riser and return portions of said rope conveyor moving in opposite directions relative to one another.

15. The conveying apparatus as recited in claim 11, *wherein* said [moving] means *for engaging* includes:

an arrangement movably supporting said opposite end portions of said flexible rope conveyor; and a drive mechanism engaged with said rope conveyor and being operable for moving said rope conveyor about said endless path.

16. The conveying apparatus as recited in claim 15, wherein said arrangement includes a pair of roller members entraining said opposite end portions of said rope conveyor adjacent to said opposite ends of said tubular wall.

17. The conveying apparatus as recited in claim 15, wherein said drive mechanism is engaged with said rope conveyor so as to apply linear traction to said rope conveyor for moving it about said endless path.

18. The conveying apparatus as recited in claim 15, wherein said drive mechanism is a motion-producing device coupled to said rope conveyor and being operable for moving said rope conveyor about said endless path with said riser and return portions of said rope conveyor moving in opposite directions relative to one another.

19. A conveying apparatus for lifting fluid, comprising:

(a) means for forming a pair of flexible tubular walls defining separate elongated passages having opposite ends;

(b) an endless flexible rope conveyor having riser and return portions disposed through different ones of said respective passages defined by said tubular walls, and a pair of opposite end portions interconnecting said riser and return portions and extending from said respective opposite ends of said flexible tubular walls, said riser portion of said rope conveyor and said one tubular wall surrounding said riser portion forming an annulus therebetween extending between said opposite ends of said one tubular wall; and (c) means for moving said rope conveyor about an endless path with said riser and return portions of said rope conveyor moving in opposite directions relative to one another through different ones of said passages, the radial dimension of said annulus and the velocity at which said rope conveyor is moved relative to said one tubular wall being preselected so that said riser portion in moving relative to said one tubular wall causes an annular-shaped turbulent stream of fluid to flow axially upwardly with said riser portion such that said annular-shaped stream is not substantially adhered to said riser portion of said rope conveyor but instead is entrained by said moving riser portion and moved upwardly within an annular core flow region of said annulus to thereby lift fluid through said passage of said one tubular wall.

20. The conveying apparatus as recited in claim 19, *wherein* said moving means includes:

an arrangement movably supporting said opposite end portions of said rope conveyor; and a drive mechanism coupled with said arrangement and being operable for moving said rope conveyor about said endless path.

21. The conveying apparatus as recited in claim 20, wherein said arrangement includes a pair of rotatable roller members entraining said opposite end portions of said rope conveyor adjacent to said opposite ends of said one tubular wall.

22. The conveying apparatus as recited in claim 21, wherein said drive mechanism is a motion-producing device connected to one of said roller member and being operable for rotating said roller member and thereby moving said rope conveyor about said endless path with said riser and return portions of said rope conveyor moving in opposite directions relative to one another.

23. The conveying apparatus as recited in claim 19, *wherein* said moving means includes:

an arrangement movably supporting said opposite end portions of said rope conveyor; and a drive mechanism engaged with said rope conveyor and being operable for moving said rope conveyor about said endless path.

24. The conveying apparatus as recited in claim 23, wherein said arrangement includes a pair of roller members entraining said opposite end portions of said rope conveyor adjacent to said opposite ends of said one tubular wall.

25. The conveying apparatus as recited in claim 23, wherein said drive mechanism is engaged with said rope conveyor so as to apply linear traction to said rope conveyor for moving it about said endless path.

26. The conveying apparatus as recited in claim 24, wherein said drive mechanism is a motion-producing device coupled to said rope conveyor and being operable for moving said rope conveyor about said endless path with said riser and return portions of said rope conveyor moving in opposite directions relative to one another.

27. A conveying method for lifting fluid, comprising the steps of:

(a) providing a flexible tubular wall defining an elongated passage having opposite ends;

(b) disposing a riser portion of an endless flexible rope conveyor through the elongated passage of the tubular wall such that the riser portion and the stationary tubular wall form an annulus therebetween extending between the opposite ends of the tubular wall;

(c) moving the rope conveyor about an endless path with the riser portion of the rope conveyor moving upwardly through the passage; and (d) preselecting the radial dimension of the annulus and the velocity at which the rope conveyor is moved relative to the tubular wall so that the riser portion of the rope conveyor in moving relative to the tubular wall causes an annular-shaped turbulent stream to flow axially upwardly with the riser portion of the rope conveyor such that the annular shaped stream is not substantially adhered to the riser portion of the rope conveyor but instead is entrained by the moving riser portion and moved upwardly within an annular core flow region of the annulus to thereby lift fluid through the passage of the tubular wall.

28. The conveying method as recited in claim 27, wherein said *step of* moving includes applying a circular drive traction to the rope conveyor.

29. The conveying method as recited in claim 27, wherein said *step of* moving includes applying a linear drive traction to the rope conveyor.

30. A conveying method for lifting fluid, comprising the steps of:

(a) providing a pair of flexible tubular walls respectively defining a pair of separate elongated passages having opposite ends;

(b) disposing riser and return portions of an endless flexible rope conveyor through different ones of the separate passages of the tubular walls such that the riser portion and the one tubular wall surrounding the riser portion form an annulus therebetween extending between the opposite ends of the one tubular wall;

(c) moving the rope conveyor about an endless path with the riser and return portions of the rope conveyor moving in opposite directions relative to one another through the different ones of the separate passages and with the riser portion moving upwardly through the passage defined through the one tubular wall; and (d) preselecting the radial dimension of the annulus and the velocity at which the rope conveyor is moved relative to the one tubular wall so that the riser portion of the rope conveyor in moving relative to the one tubular wall causes an annular-shaped turbulent stream to flow axially upwardly with the riser portion of the rope conveyor such that the annular-shaped stream is not substantially adhered to the riser portion of the rope conveyor but instead is entrained by the moving riser portion and moved upwardly within an annular core flow region of the annulus to thereby lift fluid through the passage of the one tubular wall.

31. The conveying method as recited in claim 30, wherein said *step of* moving includes applying a circular drive traction to the rope conveyor.

32. The conveying method as recited in claim 30, wherein said *step of* includes applying a linear drive traction to the rope conveyor.

*33. A flexible conveyor assembly for use in a conveying apparatus for moving fluid, said assembly comprising:*

*(a) means for forming a flexible tubular wall defining an elongated passage and having respective opposite ends; and*

*(b) an endless flexible rope conveyor having fluid-conveying and return portions, said fluid-conveying portion extending through said passage defined by said flexible tubular wall, said flexible rope conveyor also having opposite end portions interconnecting said fluid-conveying and return portions and extending from said opposite ends of said flexible tubular wall, said fluid-conveying portion and said flexible tubular wall which surrounds said fluid-conveying portion forming an annulus therebetween extending between said opposite ends of said flexible tubular wall;*

*(c) said flexible rope conveying being engageable at said opposite end portions for causing and guiding movement of said flexible rope conveyor about an endless path relative to said flexible tubular wall with said fluid-conveying and return portions moving in opposite directions relative to one another, the radial dimension of said annulus and the velocity at which said flexible rope conveyor is moved relative to said flexible tubular wall being preselected so that said fluid-conveying portion in moving relative to said flexible tubular wall can cause an annular-shaped turbulent stream of fluid to move axially through said passage of said flexible tubular wall with said fluid-conveying portion such that said annular-shaped turbulent stream is not substantially absorbed by said flexible rope conveyor but entrained by said moving fluid- conveying portion and moved within a continuous flow region of said annulus to thereby move fluid through said passage between said opposite ends of said flexible tubular wall.*

*34. The assembly of claim 33 wherein said means for forming said flexible tubular wall is an elongated hollow flexible tube.*

*35. A flexible conveyor assembly for use in a conveying apparatus for moving fluid, said assembly comprising:*

*(a) means for forming a flexible tubular wall defining an elongated passage and having respective opposite ends;*

*(b) an endless flexible rope conveyor having fluid-conveying and return portions, said fluid-conveying portion extending through said passage defined by said flexible tubular wall, said flexible rope conveyor also having opposite end portions interconnecting said fluid- conveying and return portions and extending from said opposite ends of said flexible tubular wall which surrounds said fluid-conveying portion forming an annulus therebetween extending between said opposite ends of said flexible tubular wall;*

*(c) an elongated tension member formed to extend along said flexible tubular wall and being attached thereto for supporting the weight of said flexible tubular wall and said rope conveyor; and*

*(d) said flexible rope conveyor being engageable at said opposite end portions for causing and guiding movement of said flexible rope conveyor about an endless path relative to said flexible tubular wall with said fluid-conveying and return portions moving in opposite directions relative to one another, the radial dimension of said annulus and the velocity at which said flexible rope conveyor is moved relative to said flexible tubular wall being preselected so that said fluid-conveying portion in moving relative to said flexible tubular wall can cause an annular-shaped turbulent stream of fluid to move axially through said passage of said flexible tubular wall with said fluid-conveying portion such that said annular-shaped turbulent stream is entrained by said moving fluid-conveying portion and moved within an annular core flow region of said annulus to thereby move fluid through said passage between said opposite ends of said flexible tubular wall.*

*36. The assembly of claim 33 wherein said means for forming said flexible tubular wall is an elongated solid core of plastic material having said tubular wall defined through the interior of said core.*

*37. A flexible conveyor assembly for use in a conveying apparatus for moving fluid, said assembly comprising:*

*(a) an elongated solid core of plastic material forming a flexible tubular wall defining an elongated passage and having respective opposite ends;*

*(b) an endless flexible rope conveyor having fluid-conveying and return portions, said fluid-conveying portion extending through said passage defined by said flexible tubular wall, said flexible rope conveyor also having opposite end portions interconnecting said fluid- conveying and return portions and extending from said opposite ends of said flexible tubular wall which surrounds said fluid-conveying portion forming an annulus therebetween extending between said opposite ends of said flexible tubular wall;*

*(c) an elongated tension member extending through the interior of said core alongside and spaced from said tubular wall for supporting the weight of said flexible tubular wall and said rope conveyor; and*

*(d) said flexible rope conveyor being engageable at said opposite end portions for causing and guiding movement of said flexible rope conveyor about an endless path relative to said flexible tubular wall with said fluid-conveying and return portions moving in opposite directions relative to one another, the radial dimension*

*of said annulus and the velocity at which said flexible rope conveyor is moved relative to said flexible tubular wall being preselected so that said fluid-conveying portion in moving relative to said flexible tubular wall can cause an annular-shaped turbulent stream of fluid to move axially through said passage of said flexible tubular wall with said fluid-conveying portion such that said annular-shaped turbulent stream is entrained by said moving fluid-conveying portion and moved within an annular core flow region of said annulus to thereby move fluid through said passage between said opposite ends of said flexible tubular wall.*

*38. The assembly of claim 33, wherein said fluid-conveying portion comprises a riser portion operable to lift said fluid against the force of gravity.*

*39. The assembly of claim 33, wherein said flexible tubular wall comprises plastic.*

*40. The assembly of claim 33, wherein said fluid comprises natural gas and oil.*

*41. The assembly of claim 33, wherein said flexible tubular wall and said flexible rope conveyor have similar cross-sectional geometries.*

*42. The assembly of claim 41, wherein said geometries are circular.*

*43. A flexible conveyor assembly for use in a conveying apparatus for moving fluid, said assembly comprising:*

*(a) means for forming a pair of flexible tubular walls defining separate elongated passages and having respective opposite ends; and*

*(b) an endless flexible rope conveyor composed of a fluid-conveying portion and a return portion extending through different ones of said respective passages defined by said flexible tubular walls, and a pair of opposite end portions interconnecting said fluid-conveying and return portions and extending from said respective opposite ends of said flexible tubular walls, said fluid-conveying portion of said flexible rope conveyor and the one of said flexible tubular walls surrounding said fluid-conveying portion forming an annulus therebetween extending between said opposite ends of said one flexible tubular wall;*

*(c) said flexible rope conveyor being engageable at its opposite end portions for causing and guiding movement of said flexible rope conveyor about an endless path relative to said flexible tubular walls with said fluid-conveying and return portions of said flexible rope conveyor moving in opposite directions relative to one another through said respective passages, the radial dimension of said annulus and the velocity at which said flexible rope conveyor is moved relative to said one flexible tubular wall being preselected so that said fluid-conveying portion in moving relative to said one flexible tubular wall can cause an annular-shaped turbulent stream of fluid to flow axially through said passage of said one flexible tubular wall with said fluid-conveying portion such that said annular-shaped turbulent stream is not substantially absorbed by said flexible rope conveyor but entrained by said moving fluid-conveying portion and moved within an annular core flow region of said annulus to thereby move fluid between said opposite ends of said passage through said one flexible tubular wall.*

*44. The assembly of claim 43 wherein said means for forming said flexible tubular walls is a pair of elongated hollow flexible tubes.*

*45. A flexible conveyor assembly for use in a conveying apparatus for moving fluid, said assembly comprising:*

*(a) a pair of elongated hollow tubes forming a pair of flexible tubular walls defining separate elongated passages and having respective opposite ends;*

*(b) an endless flexible rope conveyor composed of a fluid-conveying and a return portion extending through different ones of said respective passages defined by said flexible tubular walls, and a pair of opposite end portions interconnecting said fluid-conveying and return portions and extending from said respective opposite ends of said flexible tubular walls, said fluid-conveying portion of said flexible rope conveyor and the one of said flexible tubular walls surrounding said fluid-conveying portion forming an annulus therebetween extending between said opposite ends of said one flexible tubular wall;*

*(c) an elongated tension member attached to said flexible tubes for supporting the weight of said flexible tubes and said rope conveyor; and*

*(d) said flexible rope conveyor being engageable at its opposite end portions for causing and guiding movement of said flexible rope conveyor about an endless path relative to said flexible tubular walls with said fluid-conveying and return portions of said flexible rope conveyor moving in opposite directions relative to one another through said respective passages, the radial dimension of said annulus and the velocity at which said flexible rope conveyor is moved relative to said one flexible tubular wall being preselected so that said fluid-conveying portion in moving relative to said one flexible tubular wall can cause an annular-shaped turbulent stream of fluid to flow axially through said passage of said one flexible tubular wall with said fluid-conveying portion such that said annular-shaped turbulent stream is entrained by said moving fluid-conveying portion and moved within an annular core flow region of said annulus to thereby move fluid between said opposite ends of said passage through said one flexible tubular wall.*

*46. The assembly of claim 43 wherein said means for forming said flexible tubular walls is an elongated solid core of plastic material having said tubular walls defined through the interior of said core.*

*47. A flexible conveyor assembly for use in a conveying apparatus for moving fluid, said assembly comprising:*

*(a) an elongated solid core of plastic material, a pair of flexible tubular walls defined through an interior of said core, said tubular walls defining separate elongated passages and having respective opposite ends;*

*(b) an endless flexible rope conveyor composed of a fluid-conveying and a return portion extending through different ones of said respective passages defined by said flexible tubular walls, and a pair of opposite end portions interconnecting said fluid-conveying and return portions and extending from said respective opposite ends of said flexible tubular walls, said fluid-conveying portion of said flexible rope conveyor and the one of said flexible tubular walls surrounding said fluid-conveying portion forming an annulus therebetween extending between said opposite ends of said one flexible tubular wall;*

*(c) an elongated tension member extending through the interior of said core alongside and spaced from said tubular walls for supporting the weight of said core and said rope conveyor; and*

*(d) said flexible rope conveyor being engageable at its opposite end portions for causing and guiding move-*

*ment of said flexible rope conveyor about an endless path relative to said flexible tubular walls with said fluid-conveying and return portions of said flexible rope conveyor moving in opposite directions relative to one another through said respective passages, the radial dimension of said annulus and the velocity at which said flexible rope conveyor is moved relative to said one flexible tubular wall being preselected so that said fluid-conveying portion in moving relative to said one flexible tubular wall can cause an annular-shaped turbulent stream of fluid to flow axially through said passage of said one flexible tubular wall with said fluid-conveying portion such that said annular-shaped turbulent stream is entrained by said moving fluid-conveying portion and moved within an annular core flow region of said annulus to thereby move fluid between said opposite ends of said passage through said one flexible tubular wall.*

*48. The assembly of claim 43, and further comprising:*

*means for urging said flexible rope conveyor through said flexible tubular walls, said means for urging operable to urge said conveyor in either a forward direction or in a reverse direction, such that, when said rope conveyor is being urged in a forward direction, said fluid-conveying portion of said rope conveyor will move through a first passage of said flexible tubular walls, and such that, when said rope conveyor is being urged in a reverse direction, said fluid-conveying portion of said rope conveyor will move through a second passage of said flexible tubular walls.*

*49. A conveying apparatus for moving fluid, comprising:*

*(a) means for forming a flexible tubular wall defining an elongated passage and having opposite ends;*

*(b) an endless flexible rope conveyor having fluid-conveying and return portions, said fluid-conveying portion being surrounded by said tubular wall and disposed through said passage defined by said tubular wall, said flexible rope conveyor also having opposite end portions interconnecting said fluid-conveying and return portions and extending from said opposite ends of said flexible tubular wall, said fluid-conveying portion and said flexible tubular wall forming an annulus therebetween extending between said opposite ends of said tubular wall; and*

*(c) means for engaging said opposite end portions of said flexible rope conveyor and being operable for moving said rope conveyor about an endless path with said fluid-conveying and return portions of said rope conveyor moving in opposite directions relative to one another, the radial dimension of said annulus and the velocity at which said rope conveyor is moved relative to said tubular wall being preselected so that said fluid-conveying portion in moving relative to said tubular wall causes an annular-shaped turbulent stream of fluid to flow axially with said fluid-conveying portion such that said annular shaped turbulent stream is entrained by said moving fluid-conveying portion and moved upwardly within an annular core flow region of said annulus to thereby move fluid through said passage of said tubular wall.*

*50. The conveying apparatus as recited in claim 49 wherein said means for engaging includes:*

*an arrangement movable supporting said opposite end portion of said rope conveyor; and*

*a drive medium coupled with said arrangement and being operable for moving said rope conveyor about said endless path.*

*51. The conveying apparatus as recited in claim 50, wherein said arrangement includes a pair of rotatable roller members entraining said opposite end portions of said rope conveyor adjacent to said opposite ends of said tubular wall.*

*52. The conveying apparatus as recited in claim 51, wherein said drive mechanism is a motion-producing device connected to at least one of said roller members and being operable for rotating the last said roller member and thereby moving said rope conveyor about said endless path with said fluid-conveying and return portions of said rope conveyor moving in opposite directions relative to one another.*

*53. The conveying apparatus as recited in claim 49, wherein said moving means includes:*

*an arrangement movably supporting said opposite end portions of said flexible rope conveyor; and*

*a drive mechanism engaged with said rope conveyor and being operable for moving said rope conveyor about said endless path.*

*54. The conveying apparatus as recited in claim 53, wherein said arrangement includes a pair of roller members entraining said opposite end portions of said rope conveyor adjacent to said opposite ends of said tubular wall.*

*55. The conveying apparatus as recited in claim 53, wherein said drive mechanism is engaged with said rope conveyor so as to apply linear traction to said rope conveyor for moving it about said endless path.*

*56. The conveying apparatus as recited in claim 53, wherein said drive mechanism is a motion-producing device coupled to said rope conveyor and being operable for moving said rope conveyor about said endless path with said fluid-conveying and return portions of said rope conveyor moving in opposite directions relative to one another.*

*57. The conveying apparatus of claim 49, wherein said fluid-conveying portion comprises a riser portion operable to lift said fluid against the force of gravity.*

*58. The conveying apparatus of claim 49, wherein said flexible tubular wall comprises plastic.*

*59. The conveying apparatus of claim 49, wherein said fluid includes natural gas and oil.*

*60. The conveying apparatus of claim 49, wherein said endless rope conveyor and said tubular wall have similar cross-sectional geometries.*

*61. The conveying apparatus of claim 60, wherein said geometries are circular.*

*62. The conveying apparatus for moving fluid, comprising:*

*(a) means for forming a pair of flexible tubular walls defining separate elongated passages having opposite ends;*

*(b) an endless flexible rope conveyor having fluid-conveying and return portions disposed through different ones of said respective passages defined by said tubular walls, and a pair of opposite end portions interconnecting said fluid-conveying and return portions and extending from said respective opposite ends of said flexible tubular walls, said fluid-conveying portion of said rope conveyor and said one tubular wall surrounding said fluid-conveying portion forming an annulus therebetween extending between said opposite ends of said one tubular wall; and*

*(c) means for moving said rope conveyor about an endless path with said fluid-conveying and return portions of said rope conveyor moving in opposite directions relative to one another through different ones of said passages, the radial dimension of said annulus and the velocity at which said rope conveyor is moved relative*

*to said one tubular wall being preselected so that said fluid-conveying portion in moving relative to said one tubular wall causes an annular shaped turbulent stream of fluid to flow axially upwardly with said fluid-conveying portion such that said annular-shaped stream is not substantially absorbed by said rope conveyor but entrained by said moving fluid-conveying portion and moved upwardly within an annular core flow region of said annulus to thereby move fluid through said passage of said one tubular wall.*

*63. The conveying apparatus as recited in claim 62, wherein said moving means includes:*

*an arrangement movably supporting said opposite end portions of said rope conveyor; and*

*a drive mechanism coupled with said arrangement and being operable for moving said rope conveyor about said endless path.*

*64. The conveying apparatus as recited in claim 63, wherein said arrangement includes a pair of rotatable roller members entraining said opposite end portions of said rope conveyor adjacent to said opposite ends of said one tubular wall.*

*65. The conveying apparatus as recited in claim 64, wherein said drive mechanism is a motion-producing device connected to at least one of said roller members and being operable for rotating the last said roller member and thereby moving said rope conveyor about said endless path with said fluid-conveying and return portions of said rope conveyor moving in opposite directions relative to one another.*

*66. The conveying apparatus as recited in claim 62, wherein said moving means includes:*

*an arrangement movably supporting said opposite end portions of said rope conveyor; and*

*a drive mechanism engaged with said rope conveyor and being operable for moving said rope conveyor about said endless path.*

*67. The conveying apparatus as recited in claim 66, wherein said arrangement includes a pair of roller members entraining said opposite end portions of said rope conveyor adjacent to said opposite ends of said one tubular wall.*

*68. The conveying apparatus as recited in claim 66, wherein said drive mechanism is engaged with said rope conveyor so as to apply linear traction to said rope conveyor for moving it about said endless path.*

*69. The conveying apparatus as recited in claim 66, wherein said drive mechanism is a motion-producing device coupled to said rope conveyor and being operable for moving said rope conveyor about said endless path with said fluid-conveying and return portions of said rope conveyor moving in opposite directions relative to one another.*

*70. The conveying apparatus of claim 62, wherein said means for moving said rope conveyor is operable to move said rope conveyor either in a forward direction or in a reverse direction, such that, when said means for moving moves said rope conveyor in said forward direction, said fluid-conveying portion of said rope conveyor moves through a first of said passages, and such that, when said means for moving moves said rope conveyor in a reverse direction, said fluid-conveying portion of said rope conveyor moves through a second of said passages.*

*71. The conveying apparatus of claim 62, wherein said fluid-conveying portion comprises a riser portion operable to lift said fluid against the force of gravity.*

*72. The conveying apparatus of claim 62, wherein said fluid includes gas and oil.*

*73. The conveying apparatus of claim 62, wherein said endless rope conveyor and said tubular walls have similar cross-sectional geometries.*

*74. The conveying apparatus of claim 73, wherein said geometries are circular.*

*75. The conveying apparatus of claim 62, wherein said flexible tubular walls comprise plastic.*

*76. A method for moving fluid, comprising the steps of:*

*(a) providing a flexible tubular wall defining an elongated passage having first and second opposed ends;*

*(b) disposing a fluid-conveying portion of an endless flexible rope conveyor through the elongated passage of the tubular wall such that the fluid-conveying portion and the flexible tubular wall form an annulus therebetween extending between the opposite ends of the tubular wall;*

*(c) moving the rope conveyor about an endless path with the fluid-conveying portion of the rope conveyor moving from the first end through the passage toward the second end; and*

*(d) preselecting the radial dimension of the annulus and the velocity at which the rope conveyor is moved relative to the tubular wall so that the fluid-conveying portion of the rope conveyor in moving relative to the tubular wall causes an annular-shaped turbulent stream to flow axially with the fluid-conveying portion of the rope conveyor such that the annular shaped stream is not substantially absorbed by said rope conveyor but entrained by the moving fluid-conveying portion and moved within an annular core flow region of the annulus to thereby move fluid through the passage of the tubular wall.*

*77. The method as recited in claim 76, wherein said step of moving includes applying a circular drive traction to the rope conveyor.*

*78. The method as recited in claim 76, wherein said step of moving includes applying a linear drive traction to the rope conveyor.*

*79. A method for moving fluid, comprising the steps of:*

*(a) providing a pair of flexible tubular walls respectively defining a pair of separate elongated passages having first and second opposed ends;*

*(b) disposing fluid-conveying and return portions of an endless flexible rope conveyor through different ones of the separate passages of the tubular walls such that the fluid-conveying portion and the one tubular wall surrounding the fluid-conveying portion form an annulus therebetween extending between the opposite ends of the one tubular wall;*

*(c) moving the rope conveyor about an endless path with the fluid-conveying and return portions of the rope conveyor moving in opposite directions relative to one another through the different ones of the separate passages and with the fluid-conveying portion moving through the passage defined through the one tubular wall; and*

*(d) preselecting the radial dimension of the annulus and the velocity at which the rope conveyor is moved relative to the one tubular wall so that the fluid-conveying portion of the rope conveyor in moving relative to the one tubular wall causes an annular shaped turbulent stream to flow axially from the first end toward the second end with the fluid-conveying portion of the rope conveyor such that the annular-shaped turbulent stream is not substantially absorbed by said rope conveyor but entrained by the moving fluid-conveying portion and moved within an annular core flow region of the annulus to thereby move fluid through the passage of the one tubular wall.*

*80. The conveying method as recited in claim 79, wherein said step of moving includes applying a circular drive traction to the rope conveyor.*

*81. The conveying method as recited in claim 79, wherein said step of moving includes applying a linear drive traction to the rope conveyor.*

*82. The method of claim 79, and further comprising the steps of:*

*(e) providing a means for moving the rope conveyor which is operable to urge the rope conveyor in either a forward direction or a reverse direction;*

*(f) when the rope is being urged in a forward direction, moving the fluid-conveying portion of the rope conveyor through a first of the passages; and*

*(g) when the rope conveyor is being urged in a reverse direction, moving the fluid-conveying portion of the rope conveyor through a second of the passages.*

*83. The method of claim 79, wherein said fluid is lifted by said rope conveyor against the force of gravity.*

*84. Apparatus for conveying a fluid, comprising:*

*an elongate flexible tube having a first end for disposal adjacent a source of fluid and a second end opposed to the first end, and having a length and internal sidewall;*

*elongate flexible rope means for conveying said fluid, said rope means having a length longer than the length of the tube, an annular space between said internal sidewall and said rope means having a radial dimension; and*

*means for urging said rope means through the tube from the first end toward the second end, said radial dimension and the speed of said rope means with respect to the tube preselected such that said rope means is suspended by the fluid away from the sidewall of said tube, and such that an annulus of fluid surrounding said rope means is not substantially absorbed by said rope but entrained by said rope and moved by said rope through said tube.*

*85. The apparatus of claim 84, wherein said rope means is selected from the group consisting of ropes, strings, bands and strands.*

*86. Apparatus for conveying a fluid, comprising:*

*an elongate flexible tube having a first end for disposal adjacent a source of fluid and a second end opposed to the first end, and having a length and an internal sidewall;*

*elongate flexible rope means for conveying said fluid, said rope means having a length longer that the length of the tube, an annular space between said internal sidewall and said rope means having a radial dimension; and*

*means for urging said rope means through the tube from the first end toward the second end, said radial dimension and the speed of said rope means with respect to the tube preselected such that said rope means is suspended by the fluid away from the tube, and such that an annulus of fluid surrounding said rope means is moved by said rope through said tube, said annulus of fluid not substantially adhering to said rope means but instead being entrained by said rope means to move through said tube.*

*87. The apparatus of claim 84, wherein said rope means and said flexible tube have similar cross-sectional geometries.*

*88. The apparatus of claim 87, wherein said cross-sectional geometries are circular.*

*89. The apparatus of claim 84, wherein said flexible tube comprises plastic.*

*90. The apparatus of claim 84, wherein said flexible tube includes a riser portion operable to lift said annulus of fluid against the force of gravity.*

*91. Apparatus for conveying a fluid, comprising:*

*an elongate flexible tube having a first end for disposal adjacent a source of fluid and a second end opposed to the first end, and having a length and an internal sidewall;*

*elongate flexible rope means for conveying said fluid, said rope means having a length longer than the length of the tube, an annular space between said internal sidewalls of said tube and said rope means having a radial dimension; and*

*means for urging said rope means through the tube from the first end toward the second end, said radial dimension of said annular space and the speed of said rope means with respect to the tube preselected such that an annular core flow region of fluid is formed to be disposed between the surface of said rope means and said internal sidewalls, said annular core flow region not substantially absorbed by said rope means but entrained by said rope means to move from said first end toward said second end of said tube.*

*92. The apparatus of claim 91, wherein said rope means is selected from the group consisting of ropes, bands, strings and strands.*

*93. The apparatus of claim 91, wherein said rope means and said flexible tube have similar cross-sectional geometries.*

*94. The apparatus of claim 93, wherein said geometries are circular.*

*95. The apparatus of claim 93, wherein said flexible tube comprises plastic.*

*96. The apparatus of claim 91, wherein said flexible tube includes a riser portion operable to lift said annular core flow region against the force of gravity.*

*97. Apparatus for conveying a fluid, comprising:*

*an elongate tube having a first end for disposal adjacent a service of fluid and a second end opposed to the first end, and having a length and an internal sidewall, at least one corner or bend of said tube disposed intermediate said ends along said length;*

*elongate flexible rope means for conveying said fluid, said rope means having a length longer than the length of the tube, an annular space between said internal sidewalls and said rope means having a radial dimension; and*

*means for urging said rope means through the tube from the first end toward the second end and around said corner or bend, said radial dimension of said annular space and the speed of said rope means with respect to the tube preselected such that an annular core flow region of fluid is formed to be disposed between the surface of the rope and said internal sidewalls, said annular core flow region being entrained by said rope means to move from said first end around said corner or bend and toward said second end of said tube.*

*98. The apparatus of claim 97, wherein said rope means comprises a riser portion operable to lift said fluid in said annular core flow region against the force of gravity.*

*99. The apparatus of claim 97, wherein said tube comprises plastic.*

*100. The apparatus of claim 97, wherein the cross-sectional geometries of said tube and said rope means are similar.*

*101. The apparatus of claim 100, wherein said cross-sectional geometries are circular.*

*102. The apparatus of claim 97, wherein said rope means is selected from the group consisting of ropes, bands, strings and strands.*

*103. A method for conveying fluid, comprising:*

*inserting a rope means through a tube, an annular space between the rope means and the interior sidewall of the tube having a predetermined radial dimension;*

*disposing the tube in a path having at least one corner or bend such that a first end of the tube is disposed adjacent a source of fluid; and*

*urging the rope means through the tube at a predetermined speed, the speed of the rope means relative to the tube and said radial dimension preselected to entrain an annular core flow region of the fluid around the rope means, thereby moving the fluid from the first end of the tube around the corner or bend toward a second end of the tube.*

* * * * *